United States Patent [19]
Nixon

[11] Patent Number: 4,594,278
[45] Date of Patent: * Jun. 10, 1986

[54] ACOUSTICAL PANELS

[76] Inventor: Michael T. Nixon, 2810 N. Urbandale La., Plymouth, Minn. 55447

[ * ] Notice: The portion of the term of this patent subsequent to Mar. 4, 2003 has been disclaimed.

[21] Appl. No.: 718,235

[22] Filed: Apr. 1, 1985

Related U.S. Application Data

[63] Continuation-in-part of Ser. No. 572,466, Jan. 20, 1984.

[51] Int. Cl.⁴ ............................................. B32B 1/04
[52] U.S. Cl. ..................................... 428/68; 181/291; 181/294; 428/76; 428/131; 428/137; 428/138; 428/218; 428/246; 428/251; 428/192; 428/193
[58] Field of Search ................. 181/291, 294; 428/68, 428/76, 131, 137, 138, 218, 246, 247, 251, 192, 193, 432, 457

[56] References Cited

U.S. PATENT DOCUMENTS

| | | | |
|---|---|---|---|
| 2,147,276 | 2/1939 | Weiss | 121/33 |
| 2,802,764 | 8/1957 | Slayter et al. | 181/33 |
| 3,118,516 | 1/1964 | Feid | 181/33 |
| 3,822,762 | 7/1974 | Crispin et al. | 428/251 |
| 3,844,875 | 10/1974 | Chamberlain, III | 181/33 |
| 3,858,676 | 1/1975 | Le Masurier | 181/33 |
| 4,057,123 | 11/1977 | Erickson | 181/290 |
| 4,146,999 | 4/1979 | Petrovec et al. | 181/33 |
| 4,194,329 | 3/1980 | Wendt | 52/145 |
| 4,200,171 | 4/1980 | Seymour et al. | 181/291 |
| 4,219,376 | 8/1980 | Roman | 428/246 |
| 4,278,146 | 7/1981 | Lerner et al. | 181/291 |
| 4,313,524 | 2/1982 | Rose | 181/291 |
| 4,330,046 | 5/1982 | Lerner et al. | 181/291 |

Primary Examiner—James J. Bell
Attorney, Agent, or Firm—Orrin M. Haugen; Thomas J. Nikolai

[57] ABSTRACT

This invention relates to the field of sound control equipment, and particularly to an acoustical panel for absorbing sound generated by equipment in a sterile environment such as a clean room, kitchen, food processing plant or drug manufacturing facility. The acoustical panel is comprised of an inner core made of loosely woven fibrous material, at least one middle layer on at least one side of the inner core which enhances durability without significantly reducing the sound absorption characteristics of the inner core; and an outer layer fabricated of a durable plastic material capable of being heat shrunk.

24 Claims, 3 Drawing Figures

ACOUSTICAL PANELS

CROSS-REFERENCE TO RELATED APPLICATION

This is a continuation-in-part of application Ser. No. 572,466, filed Jan. 20, 1984.

BACKGROUND OF THE INVENTION

To ensure that their products are a high quality and free from any contamination introduced during the manufacturing process, companies in many industries, including the food preparation, electronics, medical device manufacturing and drug preparation industries, must manufacture their products in an unusually clean, sterile environment which is free of sources of contamination. Further, because the machinery used in production facilities is often very noisy, steps must be taken to maintain sound emissions at a tolerable level, i.e., a level which is comfortable for employees working in the facility and which allows the employees to easily communicate with each other. Regrettably, those means which may be taken to control sound emissions lie at cross-purposes to conventional means for avoiding contamination.

In the past, acoustical panels have been used to control sound emissions but these panels are not suitable for use in an environment where sterile, clean conditions are required. Acoustical panels used in the past have generally been made of a fibrous material to which a paint or other film-forming material was applied for appearance purposes. Also, acoustical panels traditionally have had a roughened irregular surface which created both coating difficulties, as well as cleaning difficulties. As a result, it has been extremely difficult to provide appropriate control of sound emissions in those environments where sterile and clean conditions are required, such as in typical clean-room facilities. Accordingly, these panels, as utilized in the past, were not suitable for use in a clean-room environment because:

(1) the fibrous material present on the surface of conventional acoustical panels would break down in time and the surface-exposed fibers would be dislodged and free to move throughout the clean-room facility, thus creating a source of contamination;

(2) washing or otherwise attempting to clean the panels would damage the surfaces thereof; and (3) repeated painting of the panels to maintain their appearance would destroy their sound absorbing capabilities, as well as necessitating labor-intensive operations which are, of course, time-consuming.

In later acoustical panel designs, such as that shown in U.S. Pat. No. 2,802,764, attempts were made to overcome the above-described problem by stretching a thin film or membrane of a material such as "Mylar" or "Saran" over exposed portions of the panel. Adding such a thin film, however, often caused the panel to warp and lose its desired predetermined shape. Normally, conventional acoustical panels have been in the form of rectangular parallelepipeds. Further, the film covering was simply not sufficiently durable to permit extended use and scrubbing in a manufacturing facility. Attempts by others to improve durability were too costly to be efficient.

SUMMARY OF THE INVENTION

The present invention relates to inexpensive, durable, easily cleaned acoustical panels well suited for use in clean-room facilities, such as are found in food processing plants, kitchens and drug manufacturing plants. These improved acoustical panels may be used as an effective, cost efficient sound absorbing covering for walls and ceilings or as a liner for air ducts. Other applications, of course, are likewise appropriate for these devices. Additionally, the acoustical panels of the present invention have been found to possess a noise reduction coefficient of up to 0.95, meeting U.S.D.A. and F.D.A. sanitation requirements, and to carry a Class A fire prevention rating having a flame spread of 25.

Various advantages and features of novelty which characterize the invention are pointed out with particularity in the claims annexed hereto and forming a part hereof. However, for a better understanding of the invention, its advantages, and the objects attained by its use, reference should be had to the drawings which form a further part hereof, and to the accompanying descriptive matter, in which there are illustrated and described certain preferred embodiments of the invention.

BRIEF DESCRIPTION OF THE DRAWING

In the drawings, in which reference numerals identify the various elements throughout the several views.

DESCRIPTION OF THE FIRST EMBODIMENT

Figure 1:
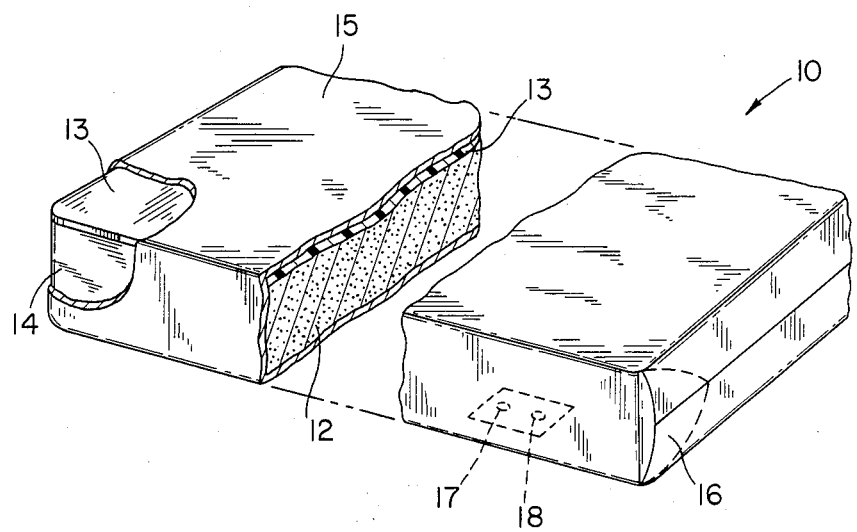
FIG. 1 is a perspective view of one embodiment of the invention with portions of certain layers thereof partially broken away so as to expose the layers and show the acoustical panel.

Referring now to FIG. 1, an acoustical panel 10 according to the invention is shown to comprise an inner core 12, a middle layer 13, edge supports 14, and an outer layer 15.

The inner core 12 is comprised of a loosely woven, sound absorbing, fibrous material, preferably fiberglass, having a density in the range from about 4 to 8 pounds per cubic foot, with about six pounds per cubic foot being preferred. This core can be of any desired size or shape. Preferably, however, it is of a uniform thickness and dimension so that the panel 10 will fit into a standard 2'×2' or 2'×4' tee-bar suspension grid. As indicated, and traditionally, this core member 12 will be in the form of a conventional rectangular parallelepiped, thus achieving the result of uniform thickness and dimension for the finished panel.

To enhance durability without adversely significantly affecting the sound absorption properties of panel 10, one or more middle layers such as middle layer 13 has been added to one or both major surfaces of the inner core portion. In the preferred embodiment, this layer is normally constructed of a tightly woven fibrous material such as molded fiberglass having a relatively greater density, such as in the range of from approximately 12 to 15 pounds per cubic foot, 13.5 pounds per cubic foot being preferred. This layer, too, is created to possess a uniform thickness, about 1/16" being the optimum thickness, and is dimensioned so that panel 1 will fit into the standard 2'×2' or 2'×4' standard tee-bar suspension grid.

Those skilled in the art will recognize that the middle layer 13 can also be constructed of a thin layer of perforated metal or of a plastic substance such as vinyl, with such a structure still permitting a high degree of sound absorption and, at the same time, producing greater durability, this structure also possessing the requisite amount of stiffness and/or resistance to warping. Use of perforated metal or a plastic member such as vinyl has the additional advantage of being easily painted a color which contrasts with the color of the outside surface of panel 10. Surface or skin perforations can cause the fibrous material to become dislodged, or to otherwise leak from the panel destroying or impairing the sterility of the clean-room environment. Hence, it is often necessary that damaged or perforated panels be quickly detected and immediately replaced. Detection of surface perforations is aided by the use of contrasting colors.

To provide a neat edge detail appearance and to produce a panel in the form of a rectangular parallelepiped with flat exposed surfaces that may be utilized to engage the tee-bar support grid on all of its four sides, edge supports 14 have been added around the perimeter of each panel between the outer layer 15 and the edges of the middle layer 13 and inner core 12. These edge supports may conveniently be constructed of high density molded fiberglass, metal or stiff plastic. However, in the preferred embodiment the perimeter edge or side supports are constructed out of pressed cardboard paper. Cardboard edge supports offer the advantages of being economical, stiff enough to produce the desired results, and not so stiff or rigid that the corners or edges cut or perforate the outer layer either while or after the outer layer is applied. Further, carboard can easily be cut, formed and configured to a size equal to the length and width of the edges of the panel. Pressed cardboard is, of course, commercially available, with a thickness of approximately 1/16th inch having been found to be suitable, desirable, and highly useful.

The purpose of the outer film layer is to contain the sound absorbing materials of the inner core and middle layer. It must be highly durable, washable, and steam-cleanable. It must not interfere with or hinder the sound absorbing characteristics of the panel, and be reasonably free of any tendency to reflect sound waves. It should also be impervious to common solvents, acids, greases and other chemicals. Cryovac films, polyolefin films and stress-oriented polyvinyl floride films such as Tedlar, manufactured by the DuPont Company, seem to sufficiently meet these design parameters, with Type 15, 1.5 mil thickness Tedlar proving to be the most effective.

The panel is constructed by mating the inner core with the middle layer and then applying the edge supports to the combination of the inner core and middle layer. Suitable adhesives may be used in these steps but the use of adhesives has been found to be generally unnecessary.

A polyvinyl floride film bag is then constructed by folding the film in the middle and welding or heat sealing along two of the edges leaving only one edge open. The bag is then inverted; the assembly of the inner core 12, middle layer 13 and edge supports 14 is inserted in the bag; the final edge is heat sealed and the film is then heat shrunk to provide a tight, firm fit. One skilled in the art will recognize that the corners can be tucked as shown generally at 16 in FIG. 1 to impove appearance. Also, the bag can be vented to allow air to escape during the heat shrinking process by putting two holes 17 and 18 in the film preferably on the backside of panel 10. These air vent holes can be covered by a label later to preserve integrity and prevent fibrous material from escaping once the heat shrinking process is complete. Finally, one skilled in the art will recognize that the panels of the invention can be modified in a number of ways to permit fastening of the panel for use in a wide variety of applications. For example, brackets can be attached to the edges with screws (if this method is used, the edges of the fiberglass should be dipped in a resin, a common practice, to increase the holding power of the screws), or grommets can be used to support perforations through the untucked seal of the polyvinyl film bag.

DESCRIPTION OF THE SECOND EMBODIMENT

Figure 2:
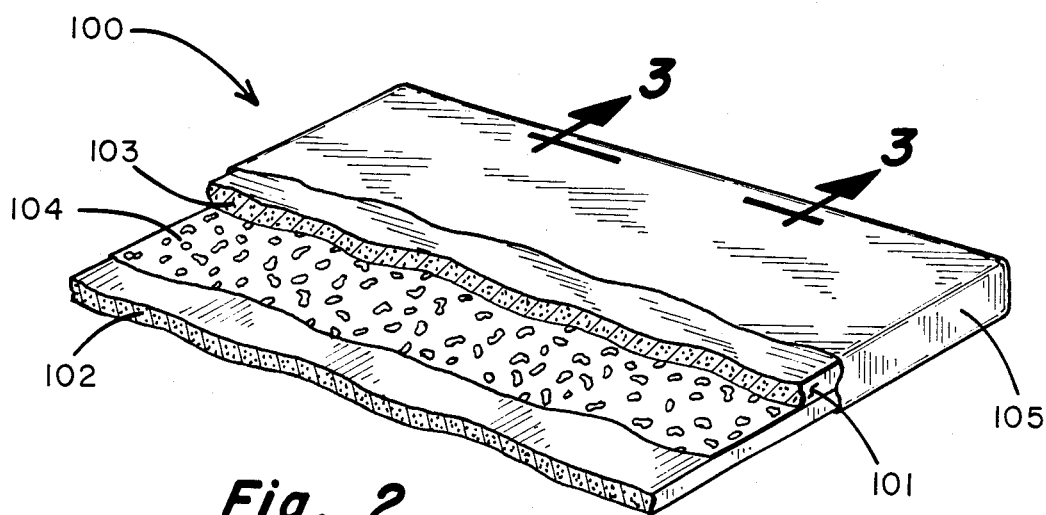
FIG. 2 is a perspective view of a second embodiment of the invention with portions of certain layers thereof partially broken away so as to expose the layers and show the acoustical panel.
Figure 3:
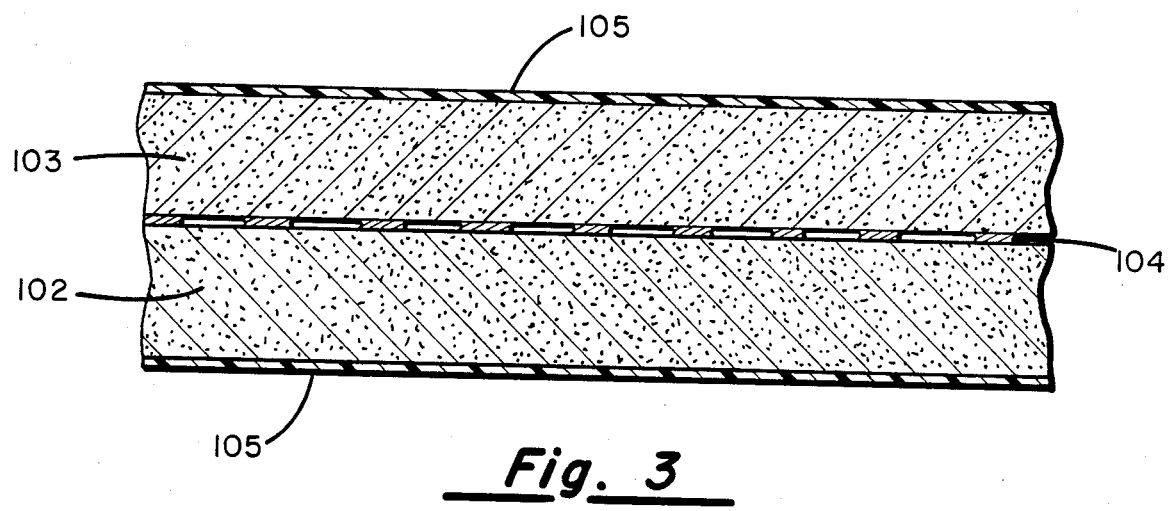
FIG. 3 is a cross-sectional view of the panel of FIG. 2 through line 3—3.

Referring now to FIGS. 2 and 3, an acoustical panel 100 according to the invention is shown to comprise an inner core 101 and an outer covering 105. The inner core 101 is comprised of three layers. The first layer 102 is comprised of a loosely woven, sound aborbing, fibrous material. The preferred material for this layer is fiberglass. Layer 103 is constructed out of a durable, rigid, mineral board. Between layers 102 and 103 is a third layer 104 which is comprised of an adhesive applied in a spatter pattern so that it does not prevent sound transmission between the layers 102 and 103 of the panel. The inner core 101 of the panel can be of any desirable size or shape. Preferably, however, it is of uniform thickness and dimension so that the panel 100 will fit into a standard 2'×2' or 2'×4' T-bar suspension grid. Traditionally, this core member 102 will be in the form of a conventional rectangular parallelepiped, thus achieving the result of uniform thickness and dimension for the finished panel.

The purpose of the outer layer 105 is to contain the sound absorbing materials of the inner core. This outer layer must be highly durable, washable and steam cleanable. It must not interfere with or hinder the sound absorbing characteristics of the panel, and must be reasonably free of any tendency to reflect sound waves. It should be impervious to common solvents, acids, greases and other chemicals.

The panel is constructed by joining layers 102 and 103 of the inner core together with a suitable adhesive which has been applied in a spatter pattern so it will not interfere with the sound absorption and transmission characteristics of layer 102 and layer 103. A polyvinyl floride film bag is then constructed and placed around the inner core in a manner substantially identical to that described for the first embodiment. It is not necessary to incorporate edge supports in the design of this embodiment to achieve a neat appearance. The materials of the inner core of this embodiment are sufficiently durable so that they do not wrap during the heat shrinking process or over time as the panel is used.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An acoustical panel comprised of an inner core fabricated of a loosely woven fibrous material; at least one middle layer disposed on at least one side of said inner core, said middle layer formed of a material which enhances durability without significantly reducing the sound absorption characteristics of the inner core; edge support means surrounding the edge surfaces of said inner core and said middle layer; and an outer layer made of a plastic film material which is impermeable to moisture and air, and which, upon exposure to heat, shrinks to achieve smooth, tight surfaces about said inner core, said middle layer and said edge support means.

2. The acoustical panel of claim 1 wherein said fibrous material of said inner core is spun fiberglass.

3. The acoustical panel of claim 2 wherein the density of said inner core is in the range of from 4 to 8 pounds per cubic foot.

4. The acoustical panel of claim 1 wherein each middle layer is constructed of a tightly woven fibrous material.

5. The acoustical panel of claim 4 wherein the tightly woven fibrous material is molded fiberglass.

6. The acoustical panel of claim 4 wherein the tightly woven fibrous material has a density in the range of from 12 to 15 pounds per cubic foot.

7. The acoustical panel of claim 1 wherein said middle layer is constructed of perforated metal.

8. The acoustical panel of claim 1 wherein said middle layer is constructed of a perforated, generally rigid, vinyl plastic.

9. The acoustical panel of clam 1 wherein said edge supports are fabricated from flat pressed cardboard.

10. The acoustical panel of claim 1 wherein said outer layer is fabricated from a polyvinyl floride film.

11. The acoustical panel of claim 1 wherein said outer layer is vented to permit gases to escape during the heat shrinking process.

12. An acoustical panel comprised of a loosely woven fiberglass inner core; at least one middle layer along at least one side of said inner core; said middle layer being constructed of molded fiberglass; a cardboard edge support having the same dimensions as and supporting at least the edge of the inner core and middle layer; and an outer layer of heat shrinkable plastic.

13. The acoustical panel of claim 12 wherein said inner core has a density of about 4 to 8 pounds per cubic foot.

14. The acoustical panel of claim 12 wherein said middle layer has a density in the range of from 12 to 15 pounds per cubic foot.

15. The acoustical panel of claim 12 wherein said outer layer is constructed of a stress-oriented polyvinyl floride film.

16. The acoustical panel of claim 12 wherein said outer layer has venting means to permit air to escape during heat shrinkage.

17. An acoustical panel comprised of an inner core having at least two layers, one of which is fabricated of a woven fibrous material and the second of which enhances durability without significantly reducing the sound absorption characteristics of the first layer; and an outer layer made of a plastic film material which impermeable to moisture and air, and which, upon exposure to heat, shrinks to achieve smooth, tight surfaces.

18. The acoustical panel of claim 17 wherein said first layer of the inner core is fiberglass.

19. The acoustical panel of claim 17 wherein said second layer is a mineral board.

20. The acoustical panel of claim 17 wherein said second layer is constructed of perforated metal.

21. The acoustical panel of claim 17 wherein said second layer is constructed of a preforated, generally rigid, vinyl plastic.

22. The acoustical panel of claim 17 wherein said outer layer is fabricated of a polyvinyl floride film.

23. The acoustical panel of claim 17 wherein said outer layer is vented to permit gases to escape during the heat shrinking process.

24. The acoustical panel of claim 17 wherein said two layers of said inner core are adhesively bonded to one another at predetermined spots.

* * * * *

UNITED STATES PATENT AND TRADEMARK OFFICE
CERTIFICATE OF CORRECTION

PATENT NO. : 4,594,278
DATED : June 10, 1986
INVENTOR(S) : Michael T. Nixon

It is certified that error appears in the above-identified patent and that said Letters Patent are hereby corrected as shown below:

Column 5, Line 32, "clam 1" should read
-- claim 1 --.

Column 6, Line 21, insert -- is -- after "which".

Signed and Sealed this

Seventh Day of October, 1986

[SEAL]

Attest:

DONALD J. QUIGG

Attesting Officer

Commissioner of Patents and Trademarks